No. 621,168. Patented Mar. 14, 1899.
P. STAUCH.
MUD GUARD FOR BICYCLES.
(Application filed Feb. 17, 1896.)
(No Model.)

Witnesses
J. Halpenny
L. E. Sharon

Inventor
Philip Stauch
By his attorneys
Gidley & Hopkins

UNITED STATES PATENT OFFICE.

PHILIP STAUCH, OF CHICAGO, ILLINOIS.

MUD-GUARD FOR BICYCLES.

SPECIFICATION forming part of Letters Patent No. 621,168, dated March 14, 1899.

Application filed February 17, 1896. Serial No. 579,542. (No model.)

*To all whom it may concern:*

Be it known that I, PHILIP STAUCH, a citizen of the United States, residing at Chicago, in the county of Cook and State of Illinois, have invented certain new and useful Improvements in Mud-Guards for Bicycles or other Vehicles, of which the following is a specification, reference being had to the accompanying drawings, which are made a part of this specification, and in which—

Figure 1:
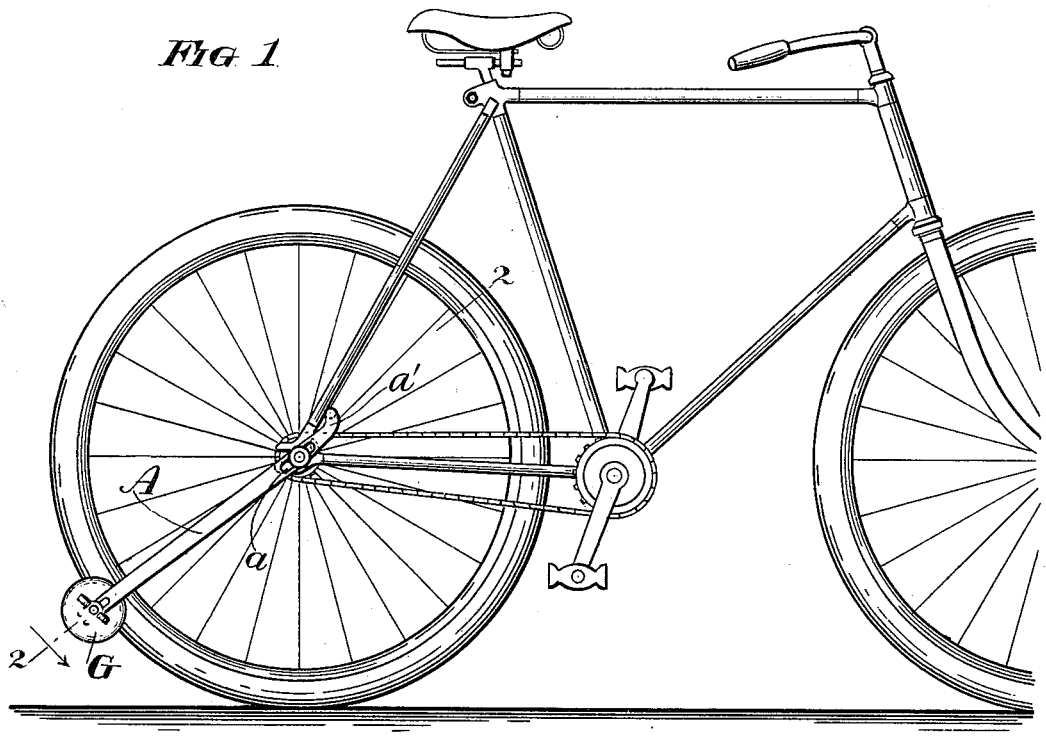
Figure 2:
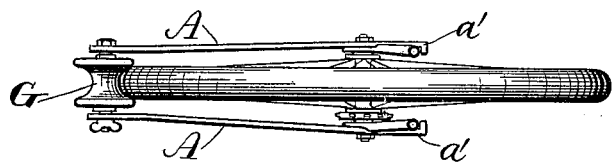
Figure 3:
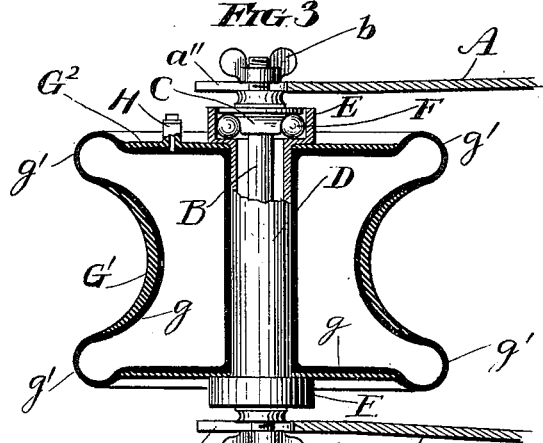

Figure 1 is a side elevation of a portion of a bicycle and of one of the improved mud-guards applied to the rear wheel thereof. Fig. 2 shows the rear wheel and guard viewed in the direction of the arrow 2, Fig. 1. Fig. 3 is a section of a portion of the mud-guard, the plane of the section being indicated by the line 2 2, Fig. 1.

A A represent a pair of arms which may be secured to any convenient part of the frame, but which are preferably secured thereto by the check-nuts on the axle. In such cases they are provided with openings $a$, (preferably elongated,) through which the axle passes, and they are provided with extensions $a'$, which engage the frame and prevent the outer ends of the arms from dropping below normal positions. These arms extend slightly beyond the periphery of the wheel, and at their outer extremities are provided with slots $a''$ for receiving an axle B, the slots being preferably open, so that the axle may be inserted in or removed from them by a lateral movement. The ends of the axle are threaded for the reception of cones C and thumb-nuts $b$, by which latter the arms A may be clamped against the cones or against washers arranged against their outer faces. The axle passes through a tube D, forming a hub and having cups E, in which are arranged antifriction-balls F. This tube then forms the hub of a hollow elastic idle-roller G, having a continuous smooth periphery provided with a groove which is complementary to the outer periphery of the wheel, and the parts are so adjusted that when in operation this roller will be held in contact with the wheel by a slight pressure—just sufficient pressure to insure a constant contact. This roller aids gravity and centrifugal force in dislodging mud and water from the wheel, and by placing it at the proper point on the periphery of the wheel the mud and water may be thrown off before reaching points from which, if thrown off, they will strike the rider or the frame of the machine.

The invention is not limited to any particular means for supporting the roller and holding it in contact with the wheel, nor to a roller located at any particular point on the periphery of the wheel, so long as it is so located that the mud and water when thrown off will not strike the rider or the frame or other part of the machine.

The roller is preferably made of soft rubber and consists of a hollow shell comprising a circular outer wall, constituting the periphery of the roller, two disk-like end walls constituting the ends of the roller and a tubular portion extending from one of the ends to the other and connecting them so as to provide within the roller an annular air-space and at the same time provide a socket in which the tube D, which forms the hub of the roller, fits. In order to preserve the concavity of its periphery and prevent it from quickly wearing out, the roller is reinforced, as shown at $G'$, and in order to preserve its flat shape at the ends it is reinforced, as shown at $G^2$. When the roller is inflated, (which may be done through a tube H, provided with a non-return valve,) the portions $g'$ of the shell, being the portions between the reinforcements $G'$ and $G^2$, will be distended. This will make the periphery of the roller sufficiently yielding to enable it to readily accommodate itself to inequalities in the periphery of the wheel.

Having thus described my invention, the following is what I claim as new therein and desire to secure by Letters Patent:

1. A rotary mud-guard for vehicle-wheels, comprising centrally-apertured end pieces, a tube in line with the openings of the end pieces and connecting them, and an outer circular wall joined at its ends to and connecting the outer ends of the end pieces, reinforcements placed against the outer sides of the end pieces, a tube fitted within the tubular portion of the guard and having its end portions enlarged to overlap the end reinforcements, an axle having the guard rotatably mounted thereon, and means for supporting the guard in contact with the wheel, substantially as described.

2. In a mud-guard for bicycles or the like, the combination with the frame, a wheel and its axle, of supporting-arms, each of the latter being provided with a slot intermediate its ends, and a slot at its outer end, and bent inwardly at its inner end to fit between the converging bars of the frame forming stops adapted to engage the frame-bars to hold the arm in its adjusted position, a rotary mud-guard adjustably supported in the outer slots of the arms, and means for adjustably securing the arms upon the axle of the wheel through the slots intermediate the ends of the arms, substantially as shown and described.

PHILIP STAUCH.

Witnesses:
M. STAUCH,
L. M. HOPKINS.